(12) United States Patent
Nies

(10) Patent No.: US 8,337,163 B2
(45) Date of Patent: Dec. 25, 2012

(54) FIBER COMPOSITE HALF-PRODUCT WITH INTEGRATED ELEMENTS, MANUFACTURING METHOD THEREFOR AND USE THEREOF

(75) Inventor: Jacob Johannes Nies, Zwoll (NL)

(73) Assignee: General Electric Company, Schenectady, NY (US)

( * ) Notice: Subject to any disclaimer, the term of this patent is extended or adjusted under 35 U.S.C. 154(b) by 1201 days.

(21) Appl. No.: 11/950,976

(22) Filed: Dec. 5, 2007

(65) Prior Publication Data

US 2009/0148655 A1    Jun. 11, 2009

(51) Int. Cl.
*F03D 11/00*    (2006.01)

(52) U.S. Cl. ....................... 416/229 R; 428/99

(58) Field of Classification Search .............. 428/99, 428/223; 416/229 R, 238; 65/442
See application file for complete search history.

(56) References Cited

U.S. PATENT DOCUMENTS

| | | | |
|---|---|---|---|
| 3,349,157 A * | 10/1967 | Parsons ...................... 264/255 |
| 4,882,201 A | 11/1989 | Crivello et al. | |
| 4,920,164 A | 4/1990 | Sasaki et al. | |
| 4,976,587 A * | 12/1990 | Johnston et al. .......... 416/230 |
| 5,015,675 A | 5/1991 | Walles et al. | |
| 5,290,883 A | 3/1994 | Hosokawa et al. | |
| 5,827,383 A * | 10/1998 | Campbell et al. .......... 156/73.1 |
| 6,187,411 B1 * | 2/2001 | Palmer ....................... 428/102 |
| 6,333,064 B1 | 12/2001 | Gan | |
| 6,518,362 B1 | 2/2003 | Clough et al. | |
| 6,632,892 B2 | 10/2003 | Rubinsztajn et al. | |
| 6,800,373 B2 | 10/2004 | Gorczyca | |
| 7,503,149 B2 * | 3/2009 | Salmon et al. .............. 52/661 |
| 7,625,185 B2 | 12/2009 | Wobben | |
| 7,790,082 B2 * | 9/2010 | Buge et al. .................. 264/258 |
| 2004/0166241 A1 | 8/2004 | Gallo et al. | |

FOREIGN PATENT DOCUMENTS

| | | |
|---|---|---|
| DE | 10336461 A1 | 3/2005 |
| WO | 03057457 A1 | 7/2003 |
| WO | WO 03/072628 | 9/2003 |
| WO | 2004110862 A1 | 12/2004 |
| WO | WO 2006/069581 A1 * | 7/2006 |

* cited by examiner

*Primary Examiner* — Dwayne J White
(74) *Attorney, Agent, or Firm* — Global Patent Operation; Douglas D. Zhang

(57) ABSTRACT

A prefabricated half-product for use in manufacture of a fiber-reinforced composite part of a wind turbine is provided, the half-product comprising at least one fiber mat and at least one inlay which is attached to the at least one fiber mat such that the relative position of the at least one inlay with respect to the at least one fiber mat remains substantially fixed during the manufacture of the fiber-reinforced composite part of the wind turbine. Furthermore, a method for manufacturing the half-product and method for the use of the half-product are provided.

18 Claims, 12 Drawing Sheets

80

90

1000 — providing a first fiber mat 200

1050 — arranging at least one inlay 100 on the first fiber mat

1070 — arranging a second fiber mat 201 on the at least one inlay 100

1100 — attaching the at least one inlay 100 at least to the first fiber mat

Fig. 9

```
1000 → providing a first fiber mat 200
  ↓
1050 → arranging at least one inlay 100 on the first fiber mat 200
  ↓
1060 → arranging of filler material 210 on the first fiber mat 200
  ↓
1070 → arranging a second fiber mat 201 on the at least one inlay 100
  ↓
1100 → attaching the at least one inlay 100 at least to one of the fiber mats 200 and 201
```

Fig. 10

2000 — arranging at least one pre-fabricated half product 10 in a mold

2100 — arranging at least one fiber mat in the mold

2200 — fiber impreganation

2300 — curing the resin

Fig. 17

FIBER COMPOSITE HALF-PRODUCT WITH INTEGRATED ELEMENTS, MANUFACTURING METHOD THEREFOR AND USE THEREOF

BACKGROUND OF THE INVENTION

A half-product for use in manufacture of fiber-reinforced composite parts and related manufacturing methods are disclosed herein. Further, the use of the half-product for forming fiber-reinforced composite parts is disclosed herein.

BRIEF DESCRIPTION OF THE INVENTION

A prefabricated half-product for use in manufacture of a fiber-reinforced composite part of a wind turbine is provided. According to a first aspect, the half-product includes at least one inlay and at least one fiber mat, wherein the at least one inlay is attached to the at least one fiber mat such that the relative position of the at least one inlay with respect to the at least one fiber mat remains substantially fixed during the manufacture of the fiber-reinforced composite part of the wind turbine.

In another aspect, a method for pre-fabricating a half-product that can be used in manufacture of a fiber-reinforced composite part of a wind turbine is provided. The method includes a step of providing a first fiber mat and a step of attaching at least one inlay to the first fiber mat such that the relative position of the inlay with respect to the at least one fiber mat remains substantially fixed during the manufacture of the fiber-reinforced composite parts of the wind turbine.

In another aspect, a method for forming a fiber-reinforced composite part of a wind turbine is provided, the method including a step of arranging at least one pre-fabricated half-product, which includes at least one fiber mat and at least one inlay attached to the at least one fiber mat, in a mold; a step of arranging at least one further fiber mat in the mold, such that the at least one further fiber mat is in contact with the at least one pre-fabricated half-product; a step of fiber impregnation, such that the least one pre-fabricated half-product and the at least one further fiber mat are resin impregnated; and a step of curing the resin.

Further aspects, advantages and features are apparent from the dependent claims, the description and the accompanying drawings.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein:

FIG. 9 shows a flow diagram of a method for forming a half-product according to still another embodiment.

FIG. 10 shows a flow diagram of a method for forming a half-product according to another embodiment.

FIG. 17 shows a flow diagram of a method for forming a fiber-reinforced composite part of a wind turbine according to an embodiment.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation. For example, features illustrated or described as part of one embodiment can be used on or in conjunction with other embodiments to yield yet a further embodiment. It is intended that such modifications and variations are included herewith.

Figure 1:
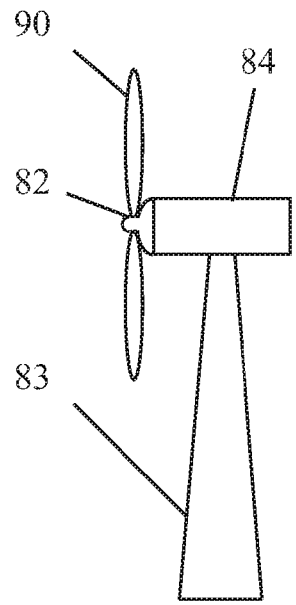
FIG. 1 shows a side view of a wind turbine.

FIG. 1 is a schematic side view of a wind turbine 80. The wind turbine 80 includes a tower 83 to which a machine nacelle 84 is mounted at its top end. The nacelle typically houses a drive train to which a main electric generator is connected, a yaw motor, a mechanical break and a controller (all not shown). A hub 82 bearing rotor blades 90 is mounted to a lateral end of the machine nacelle 84. The rotor blades 90 can be adjusted by pitch drives which are typically accommodated inside the hub 82.

Figure 2:
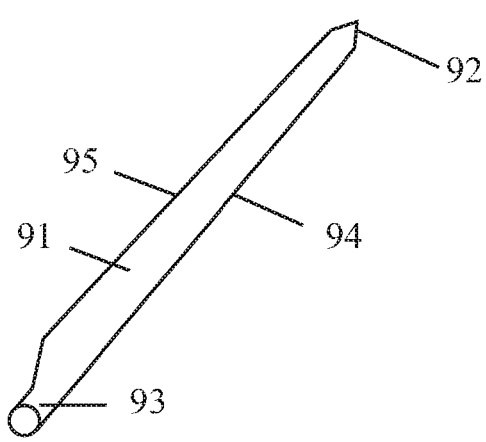
FIG. 2 shows a schematic view of a rotor blade.

FIG. 2 is a schematic view of a rotor blade 90 for use in the wind energy turbine 80. The rotor blade 90 includes a rotor blade body 91 with its rotor blade body tip 92, and a rotor blade root or flange section 93. The rotor blade root 93 is typically mounted to the wind turbine hub 82. The rotor blade body tip 92 is positioned at the opposite end of the rotor blade 90. During normal operation of the wind turbine 80, the rotor blades 90 are adjusted such that the leading edge 94 and trailing edge 95 point, in a projection to the rotation plane of the hub 82, towards the moving direction of the rotor blade 90 and opposite to it, respectively.

Many parts of the wind turbine 80 like the rotor blades 90, the housing of the nacelle 84 and the spinner, i.e. the enclosure of the hub 82 can be made of fiber composite material or fiber-reinforced composite such as reinforced glass, carbon, synthetic fibers or a combination thereof.

Fiber-reinforced composite parts of the wind turbine 80 are typically produced in a mold by laminating of fiber mats and additional functional parts. The preparation work e.g. in the mold is often laborious and time consuming to ensure the required high product quality. This limits the output of the mold which is a key factor in producing reinforced composite parts of the wind turbine such as rotor blades to fulfill the market requests. In the following it will be described how mold output and or quality can be improved by using prefabricated half-products in the mold.

In the context of this application, the term half-product refers to a separately manufactured part, unit or component that is designed to be incorporated with other units or parts into a final product. In particular, the term "half-product" refers to a prefabricated or pre-manufactured half-product which includes at least one fiber mat and at least one inlay attached to the at least one fiber mat.

In the context of this application, the term "fiber mat" should be understood as describing a piece of fabric or a mat of fibers which is suitable for producing a fiber composite material or a fiber-reinforced composite. The fiber mat can e.g. be formed as chopped strand mat (CSM). It should be further understood, that the term "fiber mat" can also refer to a stack of at least two fiber mats. Exemplary fibers that may be used in fiber mats comprise carbon fibers (e.g. TORAYCA® T800, TORAYCA® T700, and TORAYCA® T600 from Toray Industries, Inc.; MAGNAMITE® IM7 and MAGNAMITE® AS4 from Hexcel Corporation; and BESFIGHT® STS and BESFIGHT® HTS from Toho Tenax, Inc.), glass fibers (e.g. quartz, E-glass, S-2 glass, Rglass from suppliers such as PPG, AGY, St. Gobain, Owens-Corning, or Johns Manville), polyester fibers, polyamide fibers (such as NYLON™ polyamide available from E.I. DuPont, Wilmington, Del., USA), aromatic polyamide fibers (such as KEVLAR™ aromatic polyamide available from E.I. DuPont, Wilmington, Del., USA; or P84™ aromatic polyamide available from Lenzing Aktiengesellschaft, Austria), polyimide fibers (such as KAPTON™ polyimide available from E.I. DuPont, Wilmington, Del., USA), extended chain polyethylene (such as SPECTRA™ polyethylene from Honeywell International Inc., Morristown, N.J., USA; or DYNEEMA™ polyethylene from Toyobo Co., Ltd., or DSM, boron fibers, and the like. The strength of the fibers may be further increased by using techniques known in the art, such as, but not limited to, forming a plurality of layers or plies, by orientation of the fibers in a direction, and like methods. The fibers may be made available in any conventional form such as, braided, unidirectional, woven fabric, knitted fabric, swirl fabric, felt mat, wound, and the like. It should be further understood, that the fiber mats may be pre-impregnated with a resin. Usually, the fiber-reinforced composite is formed by impregnation of fiber mats with and curing of resin or plastic. Typically, the resin comprises at least one curable monomer. The monomers may have at least one isocyanate unit, ester unit, ethylenic unit, cyclic ether unit, or epoxide unit, oxetane unit, or the like, or combinations thereof. Suitable curable monomers comprise unsaturated polyester such as POLYLITE® polyester resin available from Reichhold, SYNOLITE® polyester resin available from DSM, AROPOL™ polyester resin available from Ashland; vinyl esters such as DION®, NORPOL®, and HYDREX® resins available from Reichhold, DERAKANE®, DERAKANE MOMENTUM® and HETRON® resins available from Ashland, ATLAC E-NOVA® resin available from DSM; acrylates, diacrylates, dimethacrylates, multi-functional acrylates and multifunctional methacrylates such as polyester acrylates, epoxy acrylates and urethane acrylates, and the like, available from such companies as Cytec Surface Specialties, Sartomer, Rahn, and BASF. The curable monomer is typically present in a range of from about 90% by weight to about 10% by weight, based on the total weight of the fiber composite, and more preferably, in a range of from about 80% by weight to about 20% weight, based on the total weight of the fiber composite. Suitable resins comprising at least one cyclic ether unit comprise aliphatic epoxy resins, cycloaliphatic epoxy resins such as ERL-4221, CYRACURE™ UVR-6110, CYRACURE™ UVR-6107, and CYRACURE™ UVR-6105 from Dow Chemical Company and UVACURE® 1500 from Cytec Surface Specialties; bisphenol-A epoxy resins, bisphenol-F epoxy resins, phenol novolac epoxy resins, cresol-novolac epoxy resins, biphenyl epoxy resins, multi-functional epoxy resins (i.e. epoxy resins comprising two or more epoxy groups), naphthalene epoxy resins (e.g., EPICLON® EXA-4700 from Dainippon Ink and Chemicals), divinylbenzene dioxide, 2-glycidylphenylglycidyl ether, dicyclopentadiene-type epoxy resins (e.g., EPICLON® HP-7200 from Dainippon Ink and Chemicals), multi-aromatic resin type epoxy resins, or the like, or combinations thereof. All of these classes of epoxy resins are known in the art and are widely available and preparable by known methods. Other illustrative examples of particular suitable epoxy resins and curing processes are described, for example, in U.S. Pat. Nos. 4,882, 201, 4,920,164, 5,015,675, 5,290,883, 6,333,064, 6,518,362, 6,632,892, 6,800,373; U.S. Patent Application Publication No. 2004/0166241, and WO 03/072628 A1. Multi-functional oxetane resins may also be applied.

Any of those resins should be selected with respect to a particular fiber reinforcement for producing a fiber-reinforced composite part of the wind turbine 80 with the desired mechanical and environmental properties. The resin is usually degassed under vacuum after mixing of a hardener/catalyst in the resin, to eliminate or remove all entrapped air from the liquid resin. The resin should typically be capable of proceeding through a vacuum pressure cycle environment of heat and time without formation of gas bubbles or voids.

Fillers which may further be present in fiber composites may comprise organic or inorganic fillers, reinforcing fillers, extending fillers, nanoparticles, or the like, or mixtures thereof. In particular embodiments the filler generally comprises a reinforcing filler, such as, but not limited to, a fiber having high strength. The fillers may be UV transparent fillers such as, but not limited to, glass, silica, fumed silica, alumina, zirconium oxide, nanoparticles, and the like. Alternately, the fillers may be UV opaque fillers such as, but not limited to, carbon fibers, carbon black, silicon carbide, boron nitride, zirconium oxide, titanium dioxide, chalk, calcium sulfate, barium sulfate, calcium carbonate, silicates such as talc, mica or kaolin, silicas, aluminum hydroxide, magnesium hydroxide, or organic fillers such as polymer powders, polymer fibers, or the like. In the present context UV opaque means that the material either blocks UV radiation, or absorbs UV radiation, or both. Those skilled in the art will recognize that, depending upon such factors as physical form or method of synthesis, certain fillers may be either UV opaque or UV transparent. Mixtures of more than one filler may also be used. The filler may be present in the composition in a range of from about 1% to about 90%, and more typically in a range of from about 10% to about 80% by weight, based on the total weight of the fiber composite. More preferably, the filler maybe present in a range of from about 30% to about 75% by weight, based on the total weight of the fiber composite.

Further, in the context of this application, the term "inlay" refers to a functional substructure or means that is required in the fiber-reinforced composite part of the wind turbine. The term "functional means" includes but is not limited to current-carrying means, aerodynamic means and fastening means or a combination thereof.

Figure 3:
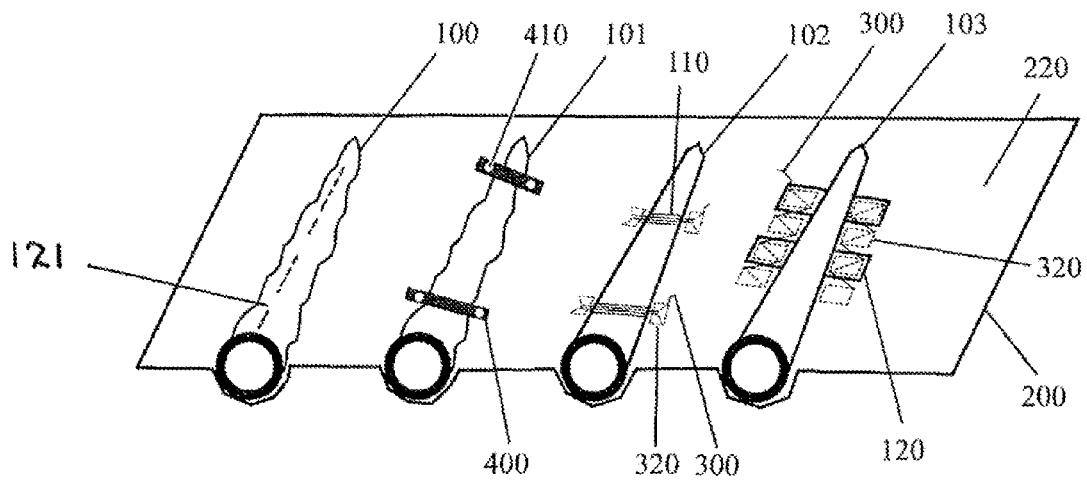
FIG. 3 shows exemplary embodiments used in half-products.

With respect to FIG. 3 several embodiments pertaining to prefabricated half-products 10 for use in manufacture of a fiber-reinforced composite part of the wind turbine 80 will be described. FIG. 3 shows an exemplary half-product 10 which consists of a fiber mat 200 and four inlays 100 to 103 attached to the fiber mat 200. In this particular case the inlays 100 to 103 are or at least include carrots for fastening the final fiber-reinforced composite part of a wind turbine 80 to other parts of the wind turbine 80. If the fiber-reinforced composite part of a wind turbine 80 can be made of sub-units which are fiber-reinforced composite parts too, the fastening means can also be used to fasten the sub-units together. For example, for segmented rotor blades 90, carrots can be used for inner blade connections. Other examples are structural elements e.g. in the rotor blade 90 itself, like shear webs and stiffening webs and non-structural elements like close out covers.

The inlays 100 to 103 are attached to the fiber mat 200 such that relative position of the inlays 100 to 103 with respect to the fiber mat 200 remains substantially fixed during the manufacture of the fiber-reinforced composite part of the wind turbine 80. The shown four inlays 100 to 103 are thereby attached to a surface 220 of the fiber mat 200 such that the relative position of the inlays 100 to 103 with respect to the surface 220 of the fiber mat 200 remains substantially fixed during the manufacture of the fiber-reinforced composite parts of the wind turbine 80.

In other words, the half-product 10 includes four inlays 100 to 103 which are attached to the fiber mat 200, such that the relative position of the inlays to each other on the surface 220 of the fiber mat 200 remains substantially fixed during the manufacture of the fiber-reinforced composite part of the wind turbine 80. For finally laminating of the fiber-reinforced composite part, the half-product 10 is typically laid into a three dimensional mold, possibly with an at least partially curved surface. The spatial arrangement of the inlays 100 to 103 can be changed by positioning the half-product 10 in the mold. This does, however, not substantially change their relative positions to each other on the surface 220 of the fiber mat 200. Further, the half-product 10 is typically disposed into the mold such that all inlays 100 to 103 are substantially arranged in their designated positions in the mold. The main advantage of using such a half-product 10 lies in the fact that the preparation work in the mold can be significantly reduced. Thereby, the output of the mold can be increased at the same or even better product quality. This applies also for a half-product 10 having only one inlay 100 attached to a suitable tailored fiber mat 200, in particular if attaching of the inlay 100 to the fiber mat 200 within the mold is difficult or laborious due to either the form or curvature of the mold or the inlay 100 itself.

As can be further appreciated from FIG. 3, the inlays 100 to 103 can be attached to the fiber mat 200 in many different ways. The outmost left inlay 100 of FIG. 3 is e.g. attached to the fiber mat 200 by gluing. The bottom side of the inlay 100 is sticking together with the fiber mat 200. But due to the chosen perspective the gluing area is masked by the inlay 100. In certain aspects, the same resin as for the final laminating process in the mold is used for gluing the inlay 100 to the fiber mat 200. This ensures a particularly stable final fiber-reinforced composite part. Further, using a glue for attaching the inlay has the advantage, that the structure of the fiber mat is not damaged which is also advantageous for the stability of the final fiber-reinforced composite part of the wind turbine 80.

In further aspects, the inlays are attached mechanically to the fiber mat 200. The inlays can either stably—as in the case of gluing—or loosely be attached to the fiber mat 200. The term "loosely attached" should be understood as describing that the relative position of the inlay with respect to the fiber mat remains substantially fixed but allows slight movements and or reorientations of the inlay to facilitate fine adjustment of the inlay in the mold prior to final laminating. In FIG. 3 only some non-limiting examples of mechanically attaching the inlays are given. Those skilled in the art will recognize that an inlay can be attached to the fiber mat 200 by any appropriate fastening means ensuring that the relative position of the inlay with respect to the fiber mat 200 remains substantially fixed until the final laminating process of the fiber-reinforced composite part of the wind turbine 80. For example, the second from the left inlay 101 is attached to the fiber mat 200 by means of a ribbon 400. In the shown example, the ribbon is attached to the fiber mat 200 by two rivets 410. The ribbon can also be fixed to the fiber mat 200 by gluing, sewing, stapling or the like. In a further embodiment, the inlay 101 is attached to the fiber mat 200 by base clamps which are thread trough the fiber mat 200 instead of the shown ribbon 400.

The inlays 102 and 103 of FIG. 3 are attached to the fiber mat 200 by sewing using a thread 300. The sewing pattern 300 can depend on the form of the inlays and determines how stable an inlay is attached to the fiber mat 200. Additionally or alternatively, tethering can be used instead of sewing. Further, each of the inlays 102 and 103 of FIG. 3 includes auxiliary means for attaching the inlays to the fiber mat 200. In the event of inlay 102, the auxiliary means consist of groove-like depressions or recesses 110 which forms guiding tracks for the thread 300. In the event of inlay 103 the auxiliary means are ring-shaped extension or fixing eyelets 120 for placing of the sewing patterns 320. Additionally or alternatively, clamps or clips can be used to attach the ring-shaped auxiliary means to the at least one fiber mat 200.

Typically, the mechanical attachment of the inlays to the fiber mat 200 is carried out such that the structure of the fiber mat 200 is not substantially damaged. This is again advantageous for the stability of the final fiber-reinforced composite part of the wind turbine 80 and can easily be achieved e.g. by sewing or tethering. Mechanical forces for attachment of the inlays to the fiber mat 200 without substantially damaging the structure of the fiber mat 200 can also be produced magnetically. For example, permanent magnets 121 can be used to fix the fiber mat 200 to the inlay 100 if the inlay 100 comprises a magnetizable material.

According to another embodiment, the half-product 10 includes one or more fastening means for attaching the later formed final fiber-reinforced composite part to another part of the wind turbine 80. The four carrots 100 to 103 in FIG. 3 are only chosen as an example of fastening means. Typically, the fastening means is a mechanical one. The inlays of the half-product 10 can be or can at least include fastening means such as a carrot, a bushing, a threaded rod, a bolt, a flange or the like. But these are again only examples for fastening means and are not meant as a limitation. Depending on the task those skilled in the art will be able to choose a suitable number and arrangement of appropriate fastening means.

If the fiber-reinforced composite part is a rotor blade 90 said fastening means can e.g. be used to mount the rotor blade to the hub 82. This will be explained in more detail below. In still another aspect, the fastening means can be used for attaching other parts to the later formed final fiber-reinforced composite part. For example, the fastening means can be a hinge for flaps or fixing points for a hatch or sill such as a root close out panel of the rotor blade 90. Similar structures can be found in other fiber-reinforced parts of the wind turbine 80 like in spinner and in nacelle 84. In yet another example, the fastening means are provided for temporary use, e.g. as auxiliary means during transport, assembly, repair or service of the wind turbine 80 or parts thereof. This is particularly advantageous, because the wind turbine 80 or its parts are typically sized up to several ten meters and are, therefore, heavy weight. The required stable auxiliary fastening means for lifting, adjusting and temporarily fixing of the fiber-reinforced parts of the wind turbine 80 can be provided in this way.

Referring again to FIG. 3, the inlays can further include at least one fixing means (not shown) such as a clip, a clamp, a hook, a ribbon or the like for attaching the inlays 100 to the fiber mat 200. Each of the inlays 102 and 103 include both a carrot as fastening means and a respective auxiliary means 110 and 120 to support the attachment of the inlays to the fiber mat 200.

In other words, the inlays may be a functional means such as a fastening means, but it may also be a sub-assembly of e.g. several functional and/or several fixing means and/or auxiliary means for attaching the inlay to the fiber mat.

Figure 4:
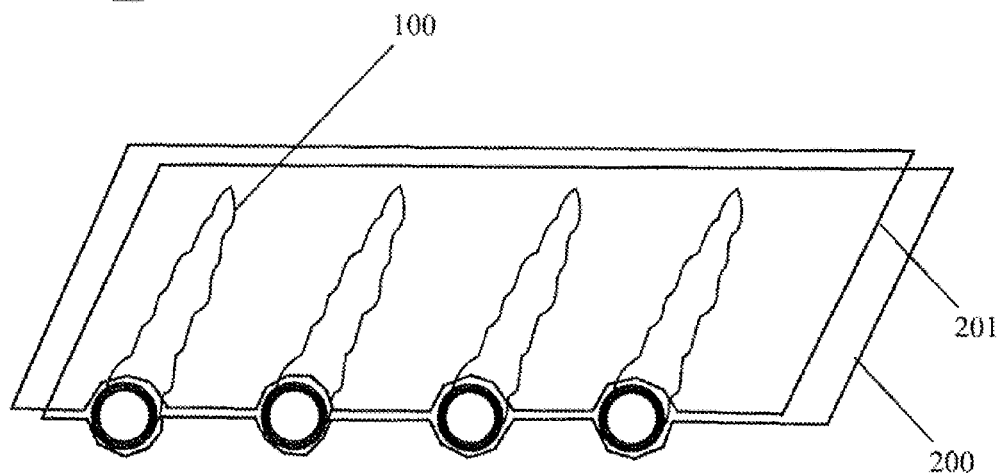
FIG. 4 shows a half-product according to another embodiment.

With reference to FIG. 4 still further aspects are described. The shown four inlays 100 in FIG. 4 are drawn as carrots but this is again only for exemplification. Either a few, several or even a large number of identical or different functional means can be used as or may be part of the inlays 100.

As shown in FIG. 4, the inlays 100 of the half-product 10 are arranged between two fiber mats 200 and 201. The inlays 100 are attached to the fiber mat 200 and/or to the fiber mat 201. In doing so, any of the above mentioned methods for attaching inlays to fiber mats, in particular, gluing, sewing, tethering, stapling, clipping, clamping, riveting or the like can be used. Typically, arranging the inlays 100 between the two fiber mats 200 and 201 simplifies their attachment. For example, in case of sewing the inlays 100 can simply be run in between the two fiber mats 200 and 201. In yet a further aspect, the inlays 100 are attached between the two fiber mats 200 and 201 by pre-laminating the fiber mats. For this purpose, the inlays 100 are firstly arranged between the two fiber mats 200 and 201. Afterwards the fiber mats are resin impregnated. Further, pre-laminating can be used in addition to one of the other above mentioned ways of attaching the inlays to the fiber mats. In an alternative, the inlays 100 are attached between the two fiber mats 200 and 201 by partially laminating the fiber mats, i.e. the fiber mats 200 and 201 are laminated only in regions that are close to a respective inlay 100.

Figure 5:
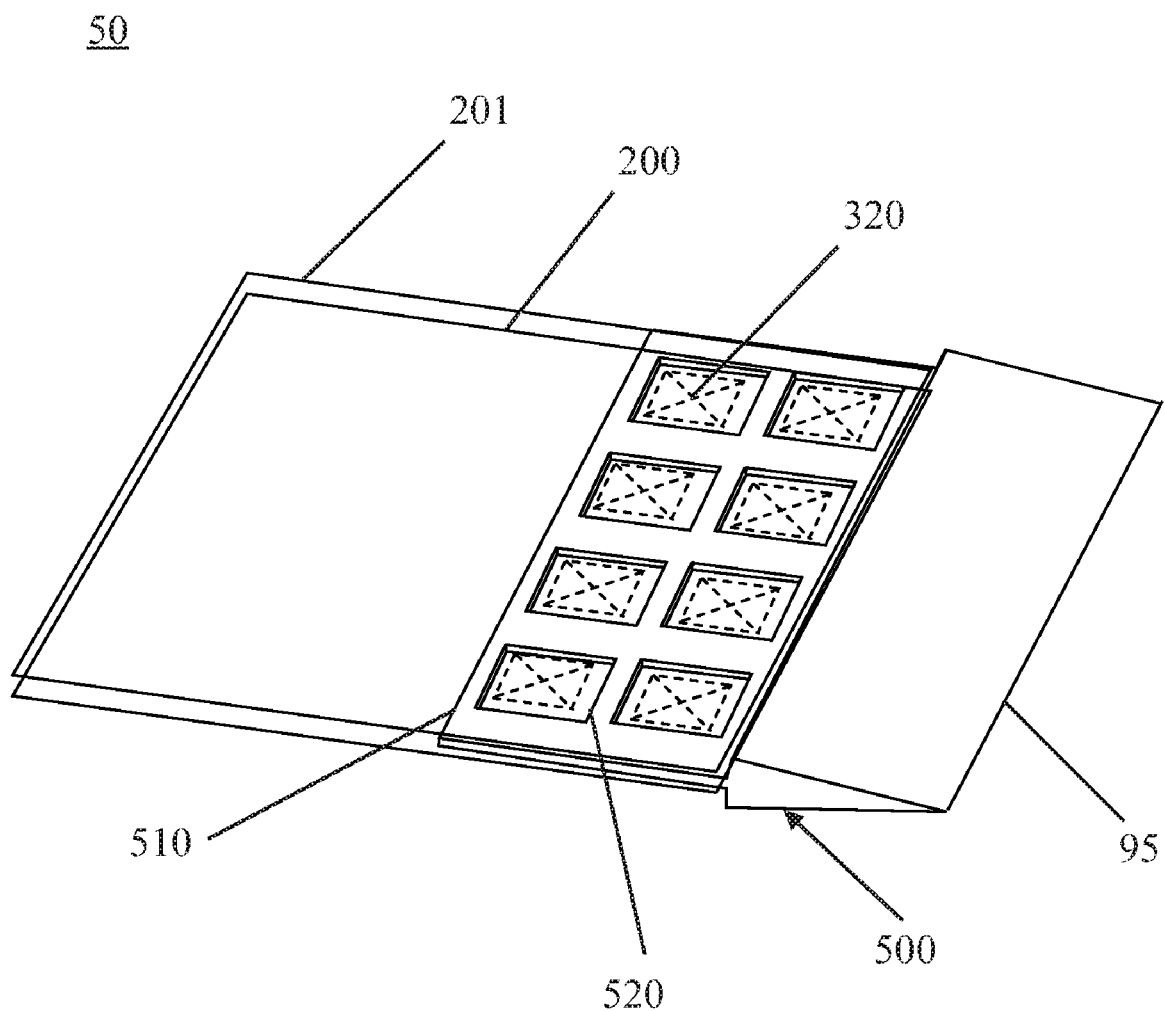
FIG. 5 shows a half-product according to still another embodiment.

FIG. 5 shows an embodiment which is related to an inlay 500 comprising an aerodynamic means. In this particular case, the half-product 50 includes an inlay 500 which can be used in manufacturing of rotor blades 90 for forming the trailing edge 95. Typically, the trailing edges 95 form a part of the profile of the rotor blade 90 and can be made of a metal such as aluminium. They can further be formed such that the noise produced by the blades 90 of the rotating rotor 82 is reduced. As can be appreciated from FIG. 5, the inlay 500 includes the trailing edge having an extension 510 with recesses 520 which can be used to fasten the inlay 500 between the fiber mats 200 and 201 e.g. by sewing the fiber mats 200 and 201 together using simple sewing patterns 320.

Those skilled in the art will appreciate that a similar half-products can be provided for the leading edge 94, and flow control means such as a wind brake, flaps and adaptable winglets of the rotor blade 90, air tubes, pumps, and valves or the like.

Figure 6:
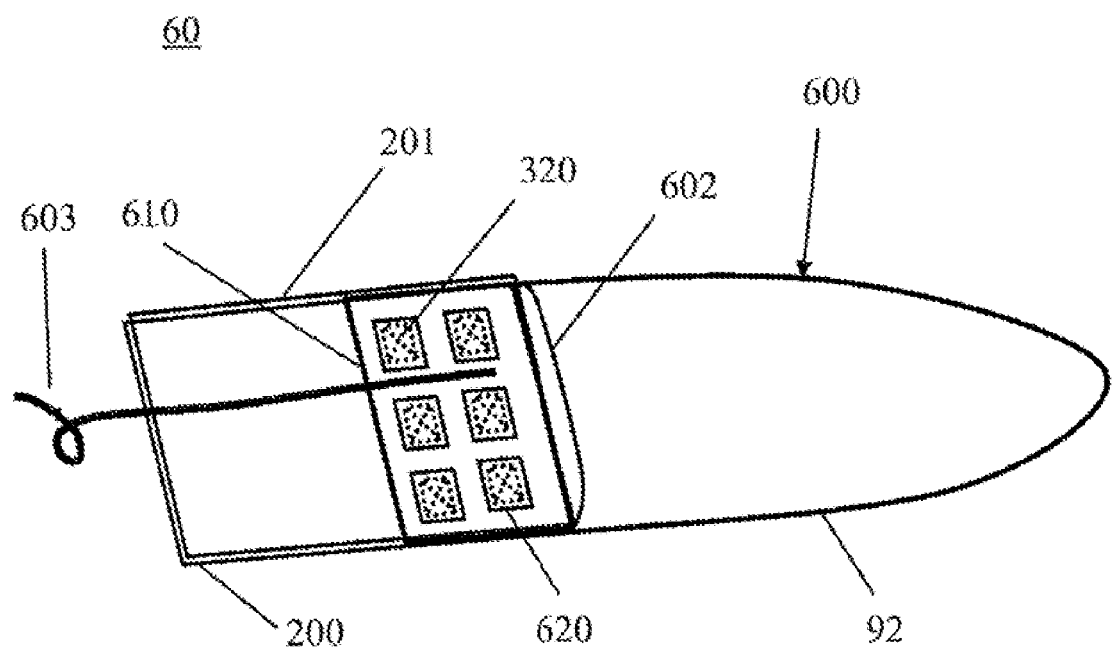
FIG. 6 shows a half-product according to yet another embodiment.

The embodiment shown in FIG. 6 is also related to a half-product 60 which can be used in manufacturing of rotor blades 90. In this event the inlay 600 forms the tip 92 of the rotor blade 90. Furthermore, it fulfils two functions: an aerodynamic one and a conducting one as part of a lightning protection system of the rotor blades 90.

As such the inlay 600 is made of a metal or another conducting and robust material such as reinforced carbon fiber-composite. As in the previous example of a trailing edge half-product 50, the inlay 600 includes an extension part 610 with recesses 620 which can be used to attach the inlay 600 between the fiber mats 200 and 201 by sewing the fiber mats 200 and 201 together using simple sewing patterns 320. In addition the inlay 600 includes a ledge 602 for to avoid contact or wetting of the tip part 92 of the inlay 600 with resin during resin impregnation and/or curing and a wire or down conductor 603 to transport high electric charges to the ground via the rotor blade root 93, nacelle 83 and tower 83 if a lightning strikes the rotor blade 90. Note that the tip may have multiple shapes like winglets, fingers, flaps and the like.

Figure 7:
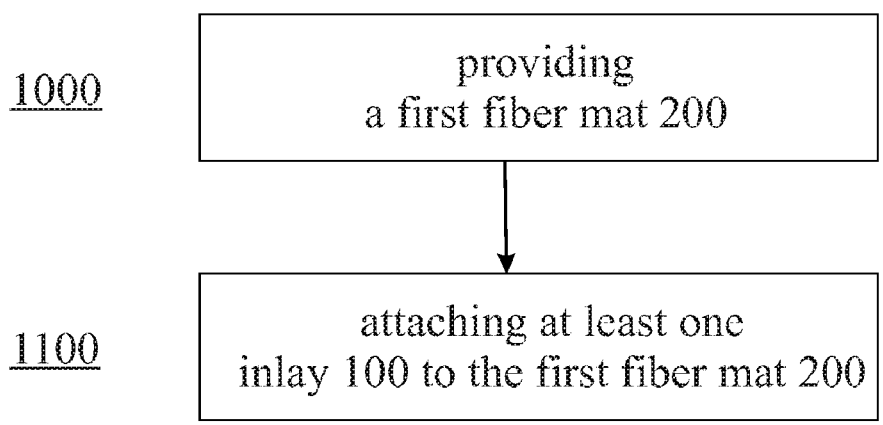
FIG. 7 shows a flow diagram of a method for forming a fiber-reinforced composite part of a wind turbine according to an embodiment.

In another embodiment, which is explained with reference to FIG. 7, a method for forming pre-fabricated half-products for use in manufacture of a fiber-reinforced composite part of the wind turbine 80 is provided. The method for forming the pre-fabricated half-product (e.g. 10, 50 or 60) includes a step 1000 of providing a first fiber mat 200; and a step 1100 of attaching at least one inlay 100 to the first fiber mat 100, such that the relative position of the inlay 100 with respect to the first fiber 200 mat remains substantially fixed during the manufacture of the fiber-reinforced composite part of the wind turbine 80. Further, in step 1000, the first fiber mat 200 can be provided already tailored to the required shape in the mold. In an alternative, a step of cutting and tailoring follows the step 1100 of attaching at least one inlay 100 to the first fiber mat 100.

The step 1100 of attaching at least one inlay 100 to the first fiber mat 200 can be carried out by gluing, sewing, tethering, stapling, clipping, clamping, riveting or a combination thereof.

Figure 8:
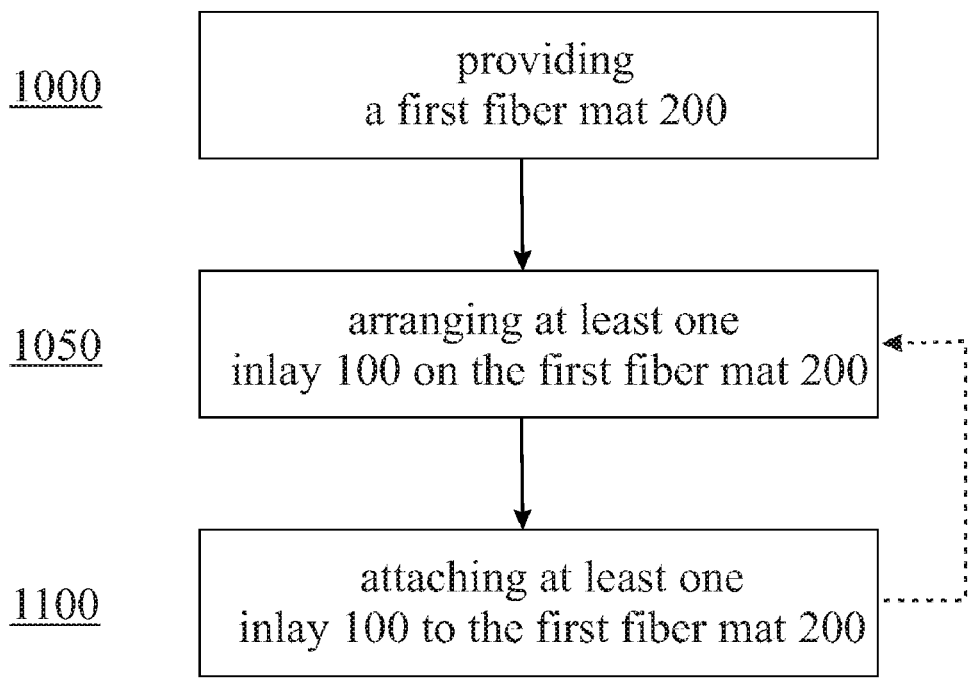
FIG. 8 shows a flow diagram of a method for forming a half-product according to another embodiment.

As shown in FIG. 8, prior to or in parallel to step 1100 a step 1050 of arranging at least one inlay 100 on the first fiber mat 200 is typically carried out. As indicated by the arrow in FIG. 8 the steps 1100 and 1050 can be repeated if e.g. further inlays are required. The number, type and arrangement of used inlays of the half-product depend on the function of the fiber-reinforced composite part of the wind turbine 80.

The required functional means of the fiber-reinforced composite parts are attached to the first fiber mat 200 in a prefabrication process to form the half-products in order to simplify the final laminate laying process in the mold, thus increasing the output per mold. Further, the quality of the laminate placement can be increased as well. More work is done as preparation, so that less work is required in or on the mold, thus increasing the mold throughput. This will increase the production output and reduce the overall production costs. Typically, the first fiber mat 200 is trimmed in the prefabrication process to fit together with the at least one further mat in the final mold. Further, the at least one inlay 100 is typically attached to the first fiber mat 200 in such a way that the at least one inlay 100 is substantially arranged in its designated position in the mold by arranging the prefabricated half-product in the mold.

In some aspects, an automated or semi-automated method for forming the pre-fabricated half-product can be established. Some half-products can e.g. be initially produced as endless lengths from which the desired section length is cut. Such cuts must not necessarily be sharp through all layers but can also be staggered as e.g. shown in FIG. 4. This is especially advantageous if the ends of the fiber mats 200 and 201 are to be closed in the mold.

In other words, the method for forming the half-product 10 can include a step of cutting into parts and/or tailoring the first fiber mat 200 having at the least one inlay 100 attached to it, such that the half-products are trimmed to fit together with at least one further fiber mat for forming the fiber-reinforced composite part of a wind turbine 80 in the mold.

With reference to FIG. 9, still another method for forming the pre-fabricated half-product for use in manufacture of a fiber-reinforced composite part of a wind turbine 80 is explained. The method described in FIG. 9 is similar to the methods shown in FIGS. 7 and 8. Therefore, the above explanations with respect to FIGS. 7 and 8 apply also to FIG. 9. However, the method shown in FIG. 9 further includes a step 1070 of arranging a second fiber mat 201 on the at least one inlay 100. In other words, in the first step 1000 the first fiber mat 200 is provided. Afterwards the at least one inlay 100 is arranged on the first fiber mat 200 in the step 1050, which is followed by step 1070 of arranging a second fiber mat 201 on the at least one inlay 100. Finally, the at least one inlay 100 is attached at least to the first fiber mat 200 in a step 1200. Typically, the at least one inlay 100 is fixed between the fiber mats 200 and 201 e.g. by sewing as has already been explained with respect to FIG. 4.

Figure 11:
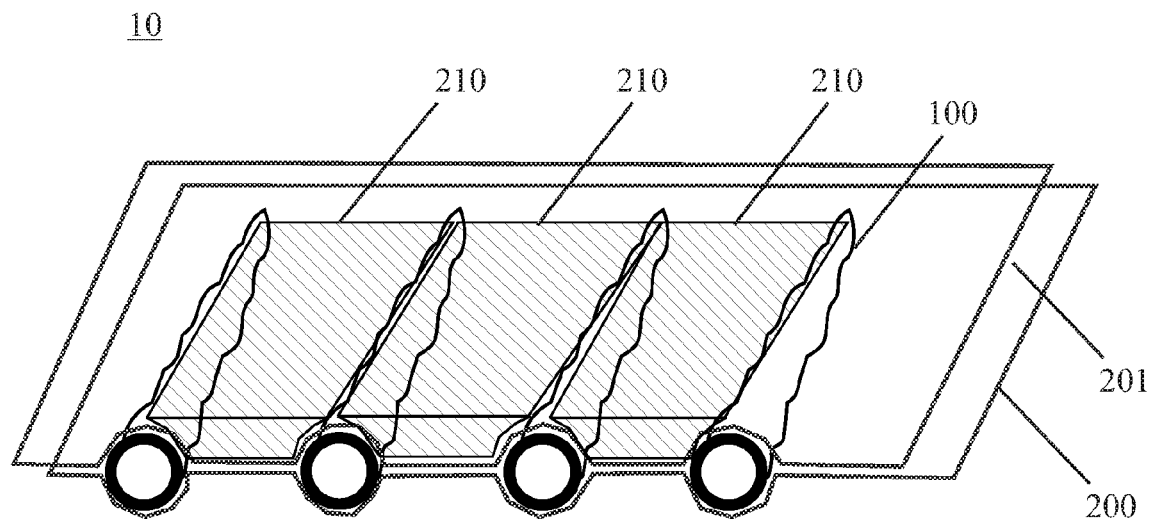
FIG. 11 shows a half-product according to yet another embodiment.
Figure 12:
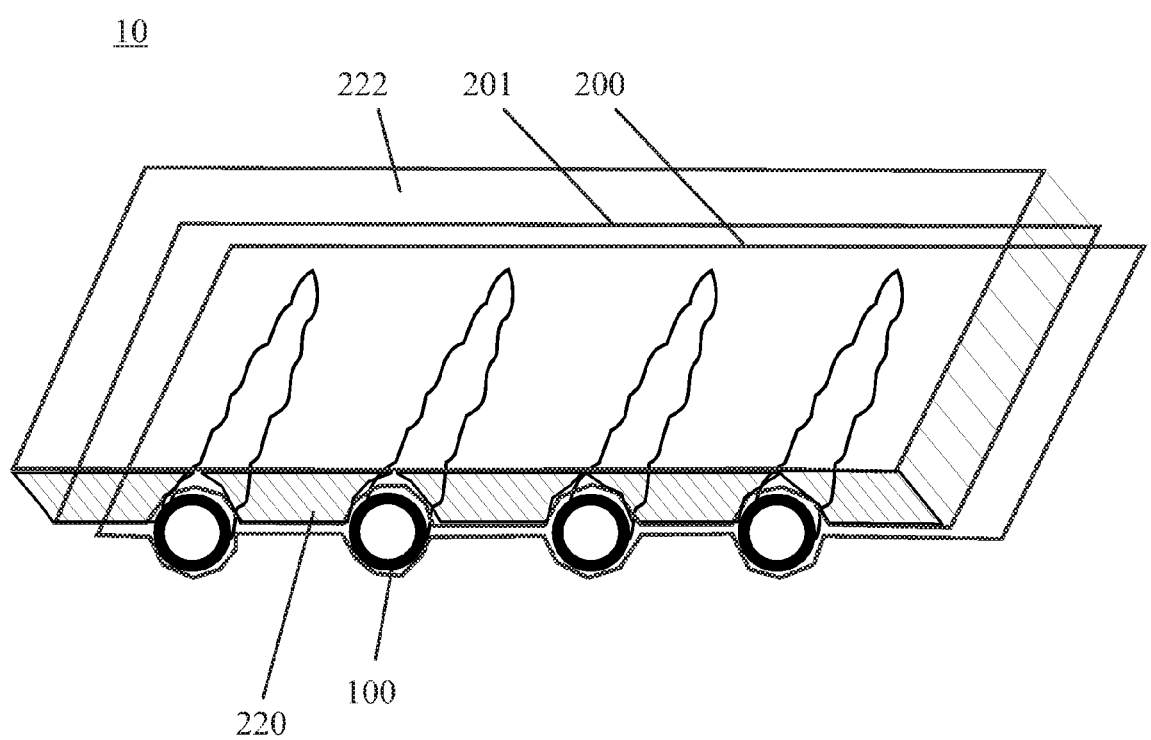
FIG. 12 shows a half-product according to still another embodiment.

With respect to FIGS. 10 to 12 still further aspects will be explained. In order to compensate any unevenness of or unwanted voids in the half-product 10 caused by the at least one inlay 100, the method for forming the half-product can further include a step of arranging a filler material on the first fiber mat 200 (FIGS. 10 to 12) or on the second fiber mat 201 (not shown). According to the flow diagram given in FIG. 10, a step 1000 of providing the first fiber mat 200 and a step 1050 of arranging at least one inlay 100 on the first fiber mat 200; is followed by a step 1060 in which a filler material 210 is arranged on the first fiber mat 200. This is followed by a step 1070 of arranging a second fiber mat 201 on the at least one inlay 100 and the step 1100 of attaching the at least one inlay 100 at least to the first fiber mat 200 or to the second fiber mat 201. Typically, the at least one inlay 100 is fixed between the fiber mats 200 and 201 e.g. by sewing which can also fasten the filler material 210 to the fiber mats 200 and/or 201. In another example, pre-laminating is used to fasten together the at least one inlay 100, the filler material 210 and the two fiber mats 200 and 201. A typical half-product 10 resulting therefrom are shown in FIGS. 11 and 12. In an alternative, the step 1001 of the method described in FIG. 10 is done prior to the step 1200 which results in half-products similar to those of FIGS. 11 and 12.

Typically, the filler material 210 is also made of the same fibers as the fiber mats 200 and 201 or at least includes carbon fibers or glass fibers or synthetic fibers or an appropriate mixture of those fibers. This is advantageous for forming a particularly stable final fiber-reinforced composite part.

To further stabilize the shape of the half-product 10, the method for forming the half-product 10 can further include a step of pre-impregnating or pre-laminating.

As indicated in FIG. 11, the voids between the inlays 100 can be filled with additional filler material 210 that is suitable shaped and arranged in order to make a good package with the inlays 100 and to make the outer and inner surface of the half-product 10 fit for applying continuous fiber in the mold. In the example of FIG. 11, the filler material 210 tapers off in the same way as the inlays 100 and is arranged to provide a smooth upper surface of the half-product 10. For reason of clarity only three parts of filler material 210 are shown. Further, the compensation of unevenness is only shown for the upper side of the half-product 10. A similar compensation can also be provided for the lower side of the half-product 10. The latter is also true for FIG. 12 showing a similar half-product as in FIG. 11. However, in this case a filler material 220 covers several inlays 100 and provides a smooth surface 222 which is fit for applying continuous fiber in the mold.

Figure 13:
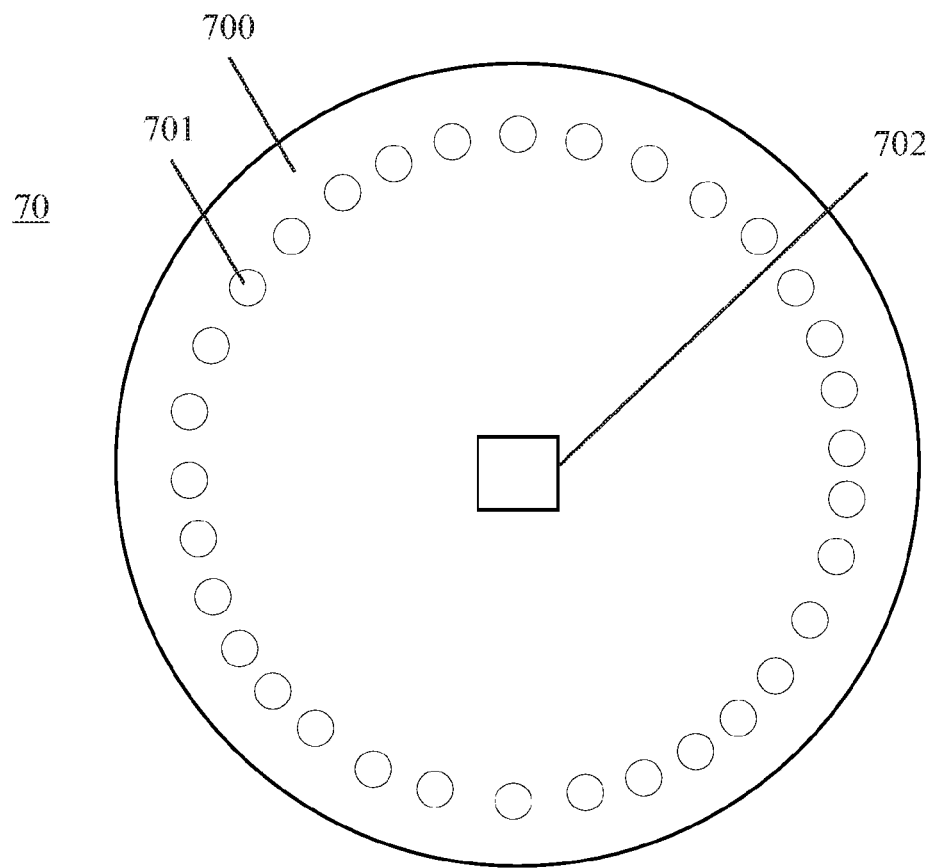
FIG. 13 shows a holder which can be used in a method for forming a half-product according to an embodiment and a method for forming a fiber-reinforced composite part of a wind turbine according to another embodiment.
Figure 14:
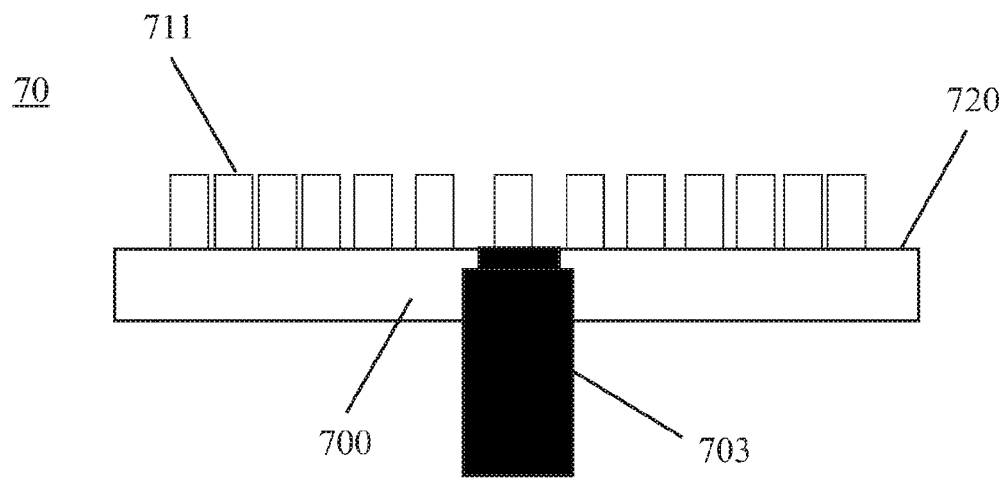
FIG. 14 shows a holder which can be used in a method for forming a half-product according to still an embodiment and a method for forming a fiber-reinforced composite part of a wind turbine according to yet another embodiment.

With respect to FIGS. 13 and 14 still further aspects will be explained. In of FIGS. 13 and 14 a holder 70 is depicted as a top view and side view, respectively. The holder is typically used to arrange and fix the inlays in their designated position in the prefabrication process of forming the half-products. The use of a holder can be particularly advantageous both for automated or semi-automated methods for forming the half-product 10. In this event the main body 700 of the holder 70 is formed as a flat cylinder. Furthermore, the holder 70 includes a recess or hole 702 for attaching permanently or removably means such as the shown shaft 703. The shaft 703 can facilitate support, defined motion and/or rotation of the holder 70. Further, the holder 70 includes recesses 701 as shown in FIG. 13 for fastening the inlays. Typically, the inlays are plugged in the recesses 701. The holder 70 of FIG. 14 includes rods 711 which are mounted on the surface 720 of the holder 70. The inlays are typically plugged on the rods. The shown recesses 701 and rods 711 as well as bolts and pins are non-limiting examples of attaching the inlays to the holder 70. The holder 70 can e.g. be used to form a half-product 10 for the root part 93 of the rotor blade 90. As such the angular separation between the different recesses 701 or rods 711 for fastening inlays is typically constant. Those skilled in the art will be able to choose an appropriate arrangement of recesses 701 and/or rods 711 for different half-products 10. Further, it is possible to provide a holder 70 suitable for different half-products 10. For example, the holder 70 can have several rings of recesses 701 in which different rods 711 can be fixed. Depending on the size of the root part 93 of the rotor blade 90 one of those rings will be selected. The holder 70 can further be used for the transport of the half-product 10 to the mold and as a tool to for forming the rotor blade 90 in the mold. In the final laminating process of the fiber-reinforced composite part the holder 70 can fulfil two tasks. Firstly, it can facilitate fine adjustment of inlays e.g. carrots and secondly it can provide mechanical support especially for heavier half-products 10.

Figure 15:
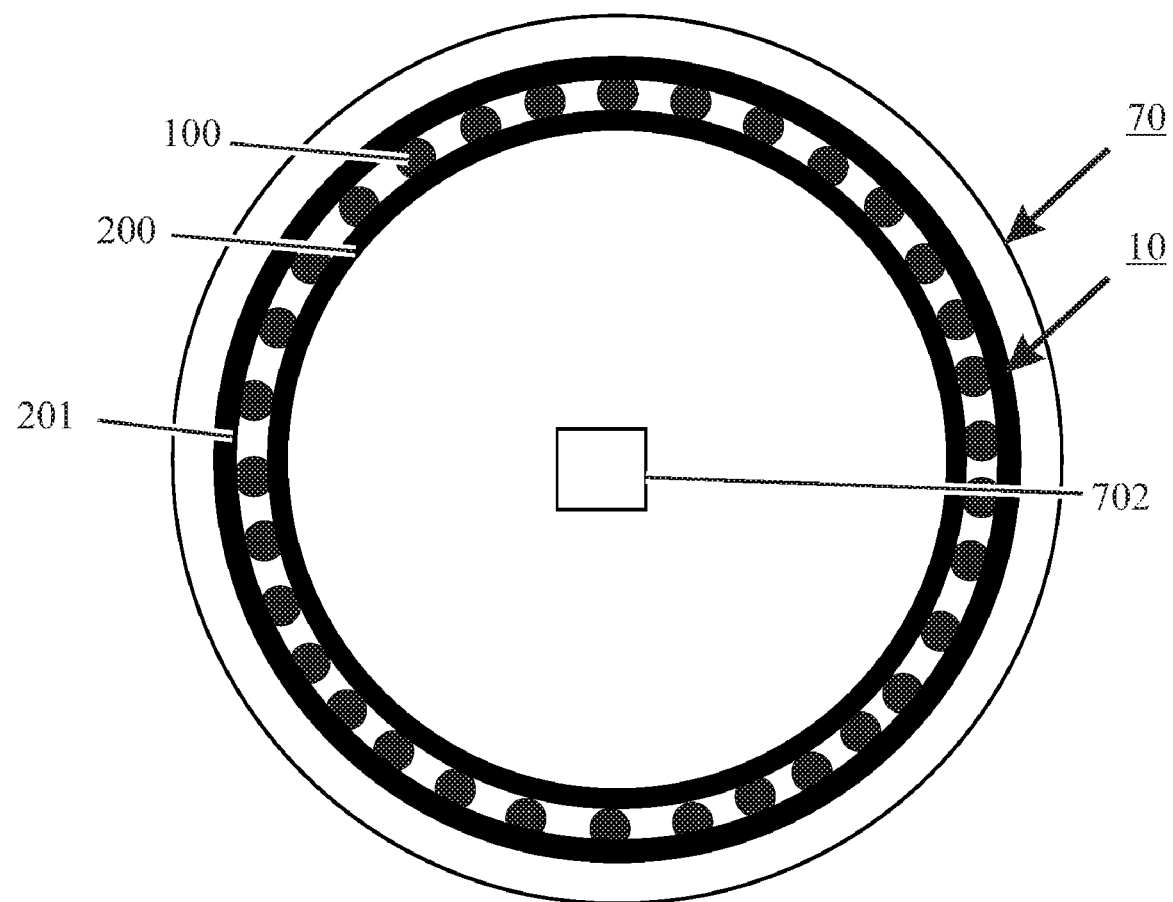
FIG. 15 shows a half-product according to still another embodiment which is attached to the holder of FIG. 13.

FIG. 15 shows a half-product 10 for the root part 93 of the blade 90 which is mounted on the holder 70. Next a method for forming the half-product 10 for use in manufacture of a root fiber-reinforced composite part of a wind turbine 80 is explained with reference to FIG. 15. Typically, the inlays 100 having e.g. carrots are mounted to the holder 70 in a first step, e.g. by plugging in recesses. In the next steps the first and second fiber mats 200 and 201 are arranged on and attached to the inlays 100 and/or each other e.g. by sewing. Advantageously, an automated sewing machine can be used for joining the inlays 100 and the fiber mats 200 and 201 whereas the holder 70 is used as rotating feeder. In addition, a filler material (not shown) can be placed in the voids between the fiber mats 200 and 201 and the inlays 100. In an alternative, pre-impregnated fiber mats 200 and 201 are arranged on the inlays 100. Afterwards, a cover sheet (not shown) for later vacuum infusion in a mold can additionally be arranged on the surface of the first fiber mat 200 which is opposite to the inlays 100. In other words, the half-product 10 includes a cover sheet for vacuum infusion in a mold. Thereby, the work in the mold can be reduced.

In one example, the half-product 10, which is mounted on the holder 70, is transported to the mold; in another example the half-product is mounted to the holder in the mold. Whereas the first case requires less work in the mold, the second needs less transport capacity.

Figure 16:
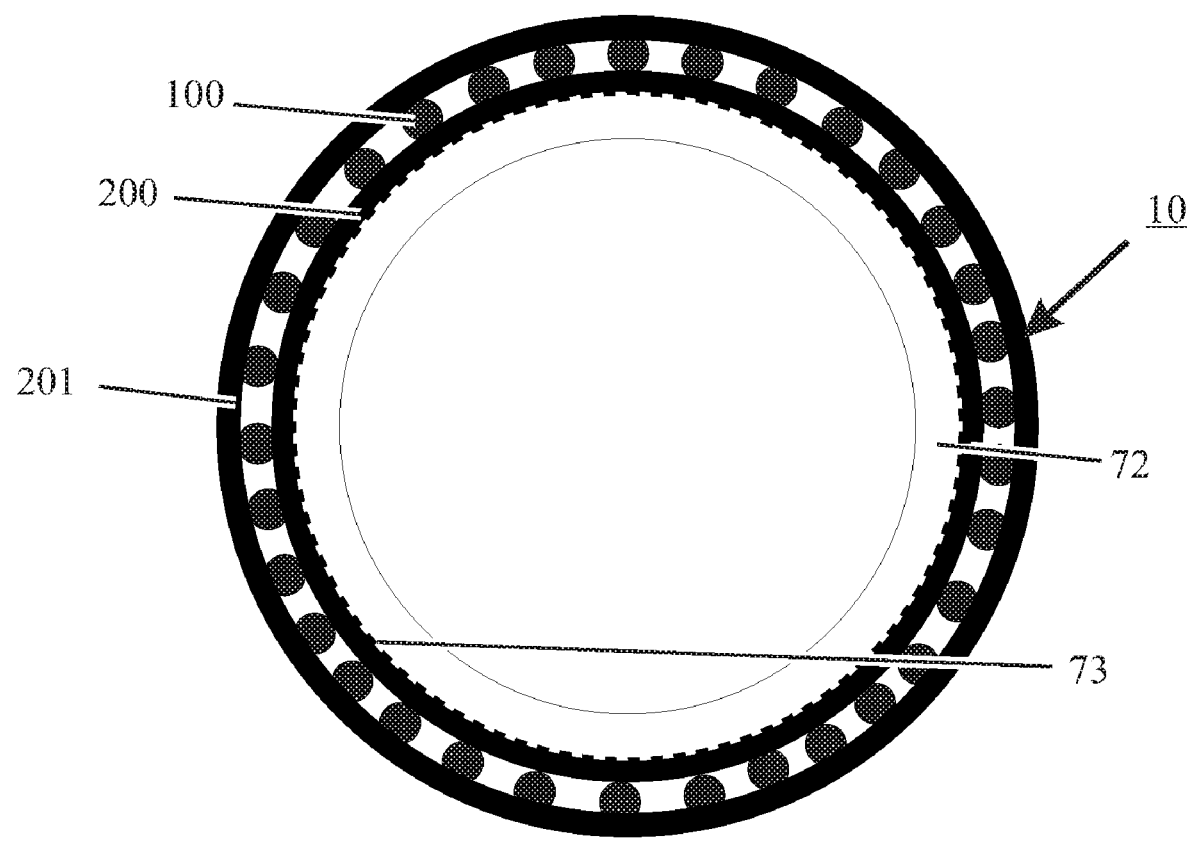
FIG. 16 shows a half-product according to still another embodiment which is attached to tyre.

The example shown in FIG. 16 refers also to a half-product 10 for the root part 93 of the rotor blade 90 wherein the inlays, e.g. carrots are fixed by pressure to the fiber mats 200 and 201. For manufacture of the half-product 10 an inner rim lined with a rubber tyre or tyre-like body 72 is used as a support. In a first step the tyre 72 is inflated with an over pressure. The outer surface of the inflated tyre should be conform with the inner surface of the half-product 10. Then a cover sheet 73 for later vacuum impregnation and a first pre-impregnated fiber mat 200 are arranged over each other on the tyre. Afterwards, the inlays 100 and filler material (not shown) are arranged on the first fiber mat 200. Finally, a second first pre-impregnated fiber mat 201 is wound up. The half-product 10 can now be transported to a mold. Note that the whole process may be supported by a holder similar to the one shown in FIGS. 13 and 14.

In yet another aspect, a method for forming a fiber-reinforced composite part of a wind turbine 80 is provided and explained with respect to FIG. 17. Accordingly, the method for forming a fiber-reinforced composite part of a wind turbine 80 includes a step 2000 of arranging at least one pre-fabricated half-product 10 in a mold; and a step 2100 of arranging at least one fiber mat in the mold, such that the at least one further fiber mat is in contact with a fiber mat of the at least one pre-fabricated half-product 10. The sequence of these two steps can also be reversed. In a subsequent step 2200 the half-product 10 and the at least one further fiber mat are resin impregnated. The step 2200 can be done by vacuum infusion of a resin into the mold or by hand with the aid of a roller or a brush in the event of hand lay up moulding. This is followed by a step 2300 of curing the resin to form the fiber-reinforced composite part of the wind turbine 80. Compared to the forming process without using the described half-products the preparation work in the mold is significantly reduced. Thus, the throughput of the mold is increased. This is in particular the case if a pre-fabricated half-product 10 which is mounted to a holder, as e.g. shown in FIG. 14, is arranged in the mold in step 2000.

In other words, the method for forming the fiber-reinforced composite part of a wind turbine 80 includes the step of placing, e.g. laying and aligning, the at least one pre-fabricated half-product 10 and the at least one further fiber mat in the mold, such that they are in contact; and a step of finally laminating the half-product 10 and the at least one further fiber mat in the mold to form the fiber-reinforced composite part of the wind turbine 80. Therein the step of finally laminating includes the step 2200 of vacuum infusion of the resin into the mold to impregnate the at least one half-product 10 and the at least one further fiber mat with the resin; and the step 2300 of curing the resin. Typically, the resin curing is done thermally e.g. by application of heat over a sufficiently long time to enable chemical cross-linking. Alternatively, the resin can be cured at room temperature by radiation-chemical curing, e.g. UV-curing or adding suitable curing agents (catalysts).

In still another aspect, the method for forming the fiber-reinforced composite part of the wind turbine 80 can include a step of providing a holder which includes at least one fastening means for at least one inlay 100 and a step of fastening the at least one inlay to the holder.

In the event of the half-product 10 described with reference to FIG. 16, a step of releasing the half-product from the tyre 72 by applying a vacuum and/or deflating and removing the tyre 72 prior to step 2200 of fiber impregnation by vacuum infusion of resin in the mold can be provided. This is to avoid permanent assembly of the tyre and the fiber-reinforced composite part of a wind turbine 80.

Further, several half-products can be arranged in the mold in step 2000. For forming the rotor blades 90 a selection from the group consisting of a root half-product 10, a trailing edge half-product 50, a leading edge half-product, a tip half-product 60, a break flap half-product, a half-product including fixing means for transport of the rotor blade 90 and a half-product including fixing points for root close out panels can e.g. be laminated together in the mold. The use of several half-products reduces the preparation work in the mold, correspondingly. According to this the mold output can be increased.

Fiber-reinforced composite parts of wind turbines like rotor blades 90, the machine frame, the housing of the nacelle and the tower 83 are typically large and can be made of or at least include sub-units which are fiber-reinforced composite parts too. The method for forming the fiber-reinforced composite part can also be applied to such sub-units. For example, rotor blades typically include at least two shells. In a first step the shells of the rotor blades are produced in a mold using the method described in FIG. 17. Afterwards, the shells are glued together thereby forming a rotor blade.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. Especially, mutually non-exclusive features of the embodiments described above may be combined with each other. Although the embodiments have been described with reference to wind turbines, those skilled in the art will appreciate that the embodiments can be practice in other fields like aircraft, ship or car construction too. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A prefabricated half-product for use in manufacture of a fiber-reinforced composite part of a wind turbine, comprising an inlay and a fiber mat, wherein the inlay comprises a metal or reinforced carbon fiber composite material and is attached to a surface of the fiber mat magnetically, or by gluing, sewing, tethering, stapling, clipping, clamping or riveting, such that the relative position of the inlay with respect to the fiber mat remains substantially fixed during the manufacture of the fiber-reinforced composite part of the wind turbine.

2. The half-product according to claim 1, wherein at least two inlays are attached to the surface of the fiber mat, such that the relative position of the at least two inlays to each other on the fiber mat remains substantially fixed during the manufacture of the fiber-reinforced composite pan of the wind turbine.

3. The half-product according to claim 1, wherein a filler material is arranged on the fiber mat.

4. The half-product according to claim 1, wherein the inlay is attached between two fiber mats.

5. The half-product according to claim 4, wherein the inlay is attached between the two fiber mats by at least one of pre-laminating the two fiber mats and partially laminating the two fiber mats in a region close to the inlay.

6. The half-product according to claim 1, wherein the inlay comprises a clip, a clamp or a hook for attaching the inlay to the fiber mat.

7. The half-product according to claim 1, wherein the inlay comprises a fixing eyelet, a recess and a groove-shaped depression for attaching the inlay to the fiber mat.

8. The half-product according to claim 1, wherein the inlay comprises a carrot, a bushing, a threaded rod, a bolt, a hinge, a fixing point or a flange for use during transport, assembly, repair or service of the wind turbine or parts thereof or for attaching the fiber-reinforced composite part to another part of the wind turbine or to parts thereof.

9. The half-product according to claim 1, wherein the inlay comprises an aerodynamic means selected from a group consisting of a blade tip a leading edge and a break flap.

10. A method for forming, a pre-fabricated half-product for use in manufacture of a fiber-reinforced composite part of a wind turbine, comprising:
providing a first fiber mat; and
attaching an inlay comprising a metal or reinforced carbon fiber composite material to a surface of the first fiber mat by gluing, sewing, tethering, stapling, clipping, clamping or riveting, such that a relative position of the inlay with respect to the first fiber mat remains substantially fixed during the manufacture of the fiber-reinforced composite part of the wind turbine.

11. The method according to claim 10, further comprising: arranging the inlay in a holder comprising a fastener for the inlay.

12. The method according to claim 10, further comprising: arranging a second fiber mat on the inlay.

13. The method according to claim 10, further comprising: pre-impregnating or pre-laminating the first fiber mat.

14. The method according to claim 10, further comprising: arranging a filler material on the first fiber mat.

15. The method according to claim 10, further comprising:
cutting into parts or tailoring the first fiber mat with the attached inlay such that half-product or half-products are trimmed to fit together with at least one further mat for forming the fiber-reinforced composite part of a wind turbine in a mold.

16. A method for forming a fiber-reinforced composite part of a wind turbine, comprising:
arranging, a pre-fabricated half-product in a mold, the pre-fabricated half-product comprising a fiber mat and a metal or reinforced carbon fiber composite inlay attached to a surface of the fiber mat;
arranging at least one further fiber mat in the mold such that the at least one further fiber mat is in contact with the pre-fabricated half-product;
impregnating fiber such that the pre-fabricated half-product and the at least one further fiber mat are resin impregnated; and
curing the resin to form the fiber-reinforced composite part of the wind turbine.

17. The method according to claim 16, further comprising: providing a holder comprising a fastener for the inlay.

18. The method according to claim 16, wherein the fiber-reinforced composite part is a blade or a housing of a wind turbine or a part thereof.

* * * * *

UNITED STATES PATENT AND TRADEMARK OFFICE
CERTIFICATE OF CORRECTION

PATENT NO. : 8,337,163 B2  
APPLICATION NO. : 11/950976  
DATED : December 25, 2012  
INVENTOR(S) : Jacob Johannes Nies Page 1 of 1

It is certified that error appears in the above-identified patent and that said Letters Patent is hereby corrected as shown below:

On the Title Page, in Item (75), under "Inventor", in Column 1, Line 1, delete "Zwoll (NL)" and insert -- Zwolle (NL) --, therefor.

In the Drawings

In Fig. 17, Sheet 12 of 12, in Box 3, Line 1, delete "impreganation" and insert -- impregnation --, therefor.

In the Specification

In Column 3, Line 2, delete "and or" and insert -- and/or --, therefor.

In Column 5, Line 66, delete "and or" and insert -- and/or --, therefor.

In Column 6, Line 14, delete "trough" and insert -- through --, therefor.

In Column 9, Line 14, delete "1200." and insert -- 1100. --, therefor.

In the Claims

In Column 12, Line 49, in Claim 2, delete "pan" and insert -- part --, therefor.

In Column 13, Line 6, in Claim 9, delete "tip" and insert -- tip, --, therefor.

In Column 13, Line 7, in Claim 10, delete "forming," and insert -- forming --, therefor.

In Column 14, Line 9, in Claim 16, delete "arranging," and insert -- arranging --, therefor.

Signed and Sealed this  
Fourth Day of June, 2013

Teresa Stanek Rea  
*Acting Director of the United States Patent and Trademark Office*